INVENTOR
Jack Raymond Green

April 18, 1967  J. R. GREEN  3,314,364
CONTROL SYSTEMS FOR PUMPS AND MOTORS
Filed May 5, 1964  6 Sheets-Sheet 3

INVENTOR
Jack Raymond Green
BY
ATTORNEYS

April 18, 1967 J. R. GREEN 3,314,364
CONTROL SYSTEMS FOR PUMPS AND MOTORS
Filed May 5, 1964 6 Sheets-Sheet 4

INVENTOR
Jack Raymond Green
BY
ATTORNEYS

April 18, 1967  J. R. GREEN  3,314,364
CONTROL SYSTEMS FOR PUMPS AND MOTORS
Filed May 5, 1964  6 Sheets-Sheet 5

INVENTOR
Jack Raymond Green
BY
Pennie, Edmonds, Morton, Taylor & Adams
ATTORNEYS April 18, 1967   J. R. GREEN   3,314,364
CONTROL SYSTEMS FOR PUMPS AND MOTORS
Filed May 5, 1964

INVENTOR
Jack Raymond Green
BY
ATTORNEYS

United States Patent Office 3,314,364
Patented Apr. 18, 1967

3,314,364
CONTROL SYSTEMS FOR PUMPS AND MOTORS
Jack Raymond Green, Weybridge, Surrey, England, assignor to Vickers Limited, London, England, a British company
Filed May 5, 1964, Ser. No. 364,928
Claims priority, application Great Britain, May 6, 1963, 17,890/63
19 Claims. (Cl. 103—38)

This invention relates to fluid pumps and motors.

According to the present invention there is provided a multi-chamber machine comprising a plurality of chambers the volume of each of which is variable, means for varying the volume of each chamber cyclically to increase and decrease same, means mounting the varying means for guided movement with respect to an axis, the position adopted by the varying means being determined by forces imposed thereon and arising from the pressures in said chambers, no additional control forces for effecting displacement of said varying means being imposed on said varying means in the direction the latter is permitted to move by the mounting means when the latter is effecting said guided movement, a fluid inlet, a fluid outlet, valve means controlling communication between the fluid inlet and the chambers and between the fluid outlet and the chambers, valve control means for cyclically operating the valve means and ensuring that each chamber is cut-off both from the inlet and outlet in each cycle during the maximum and minimum volume states of the chamber.

The phrase "guided movement with respect to an axis" as used herein is limited to including movement radially with respect to an axis and movement about a particular axis.

Figure 1:
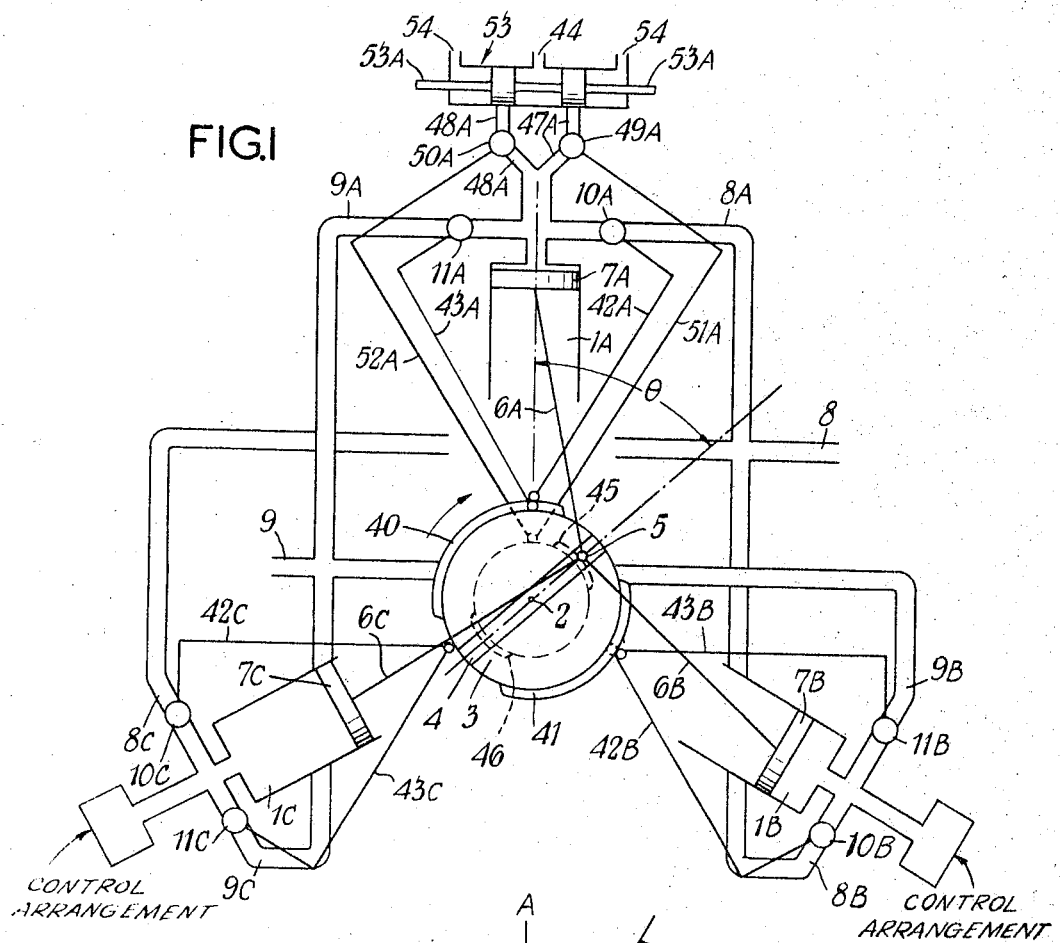
Figure 2:
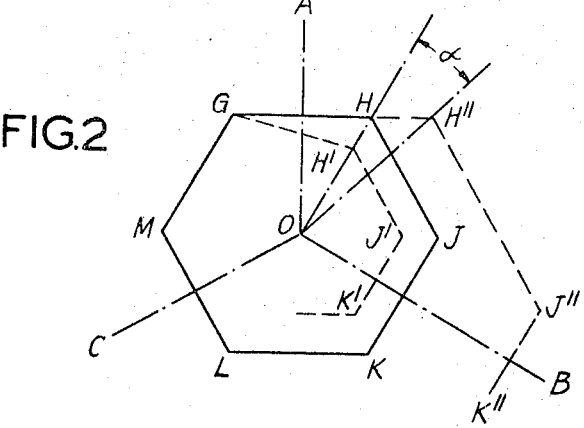
Figure 1A:
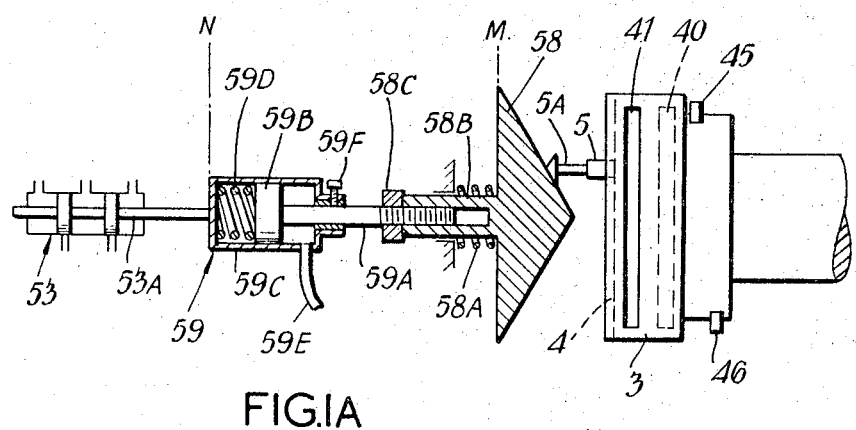
Figure 1B:
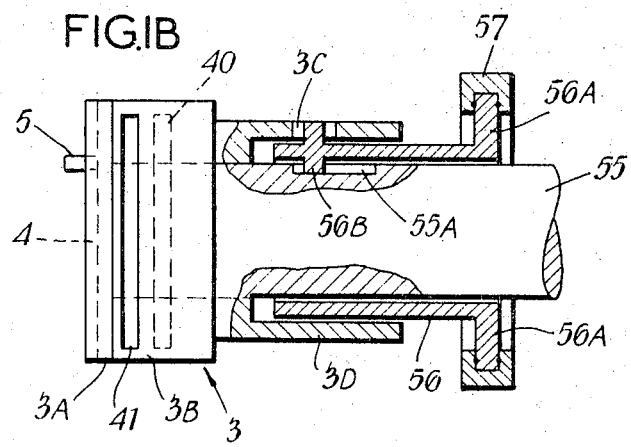
Figure 3:
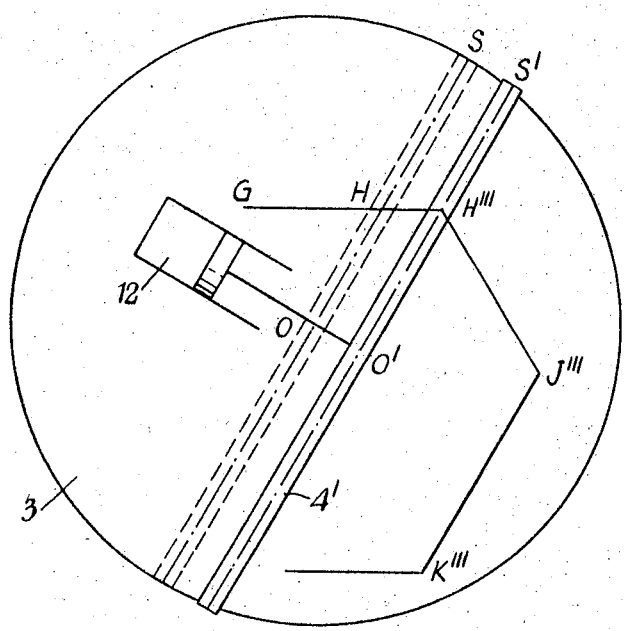
Figure 4:
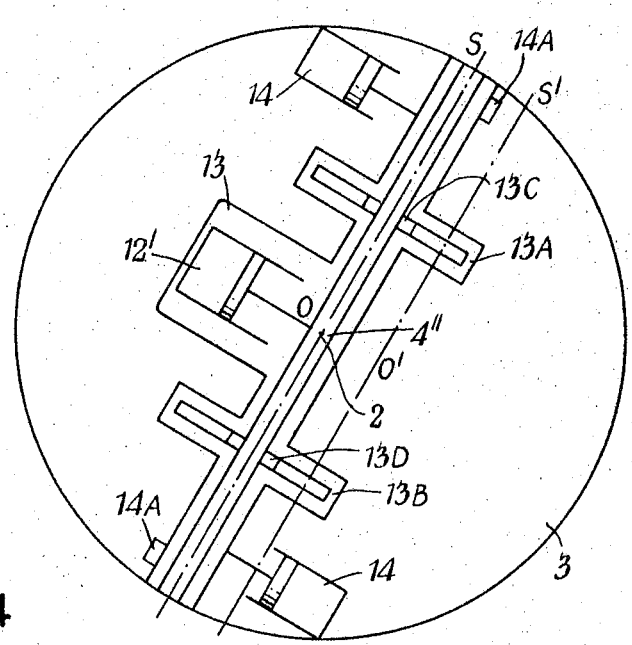
Figure 7:
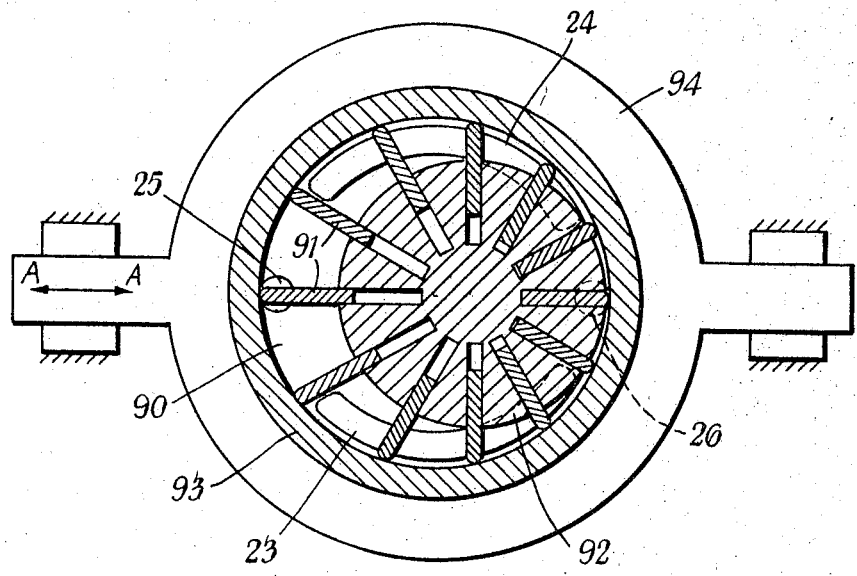
Figure 3A:
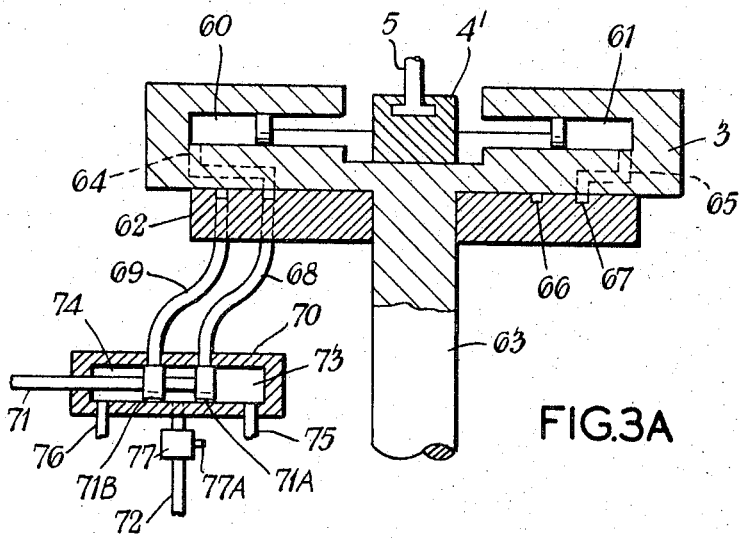
Figure 3B:
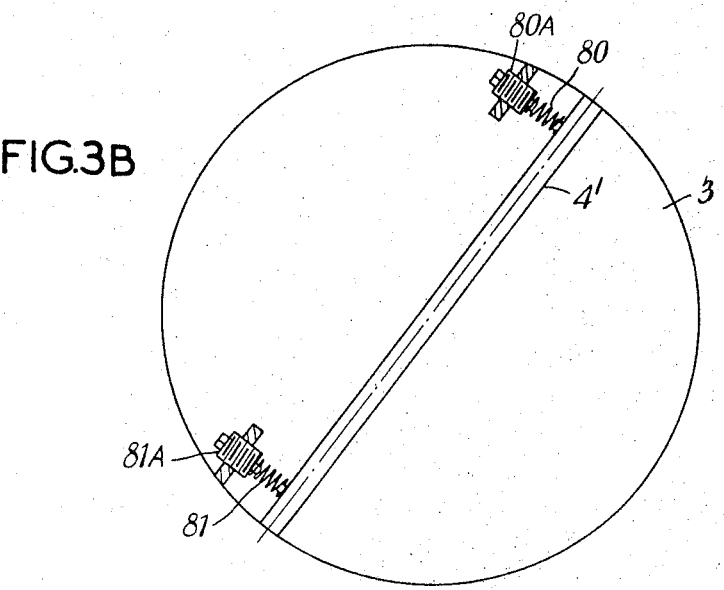
Figure 3C:
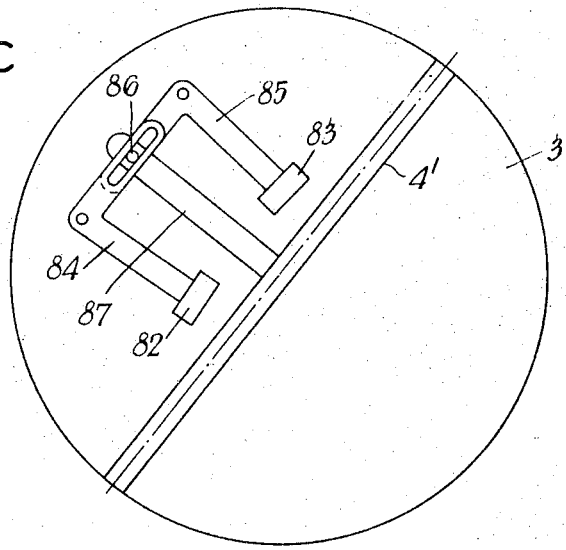
Figure 5:
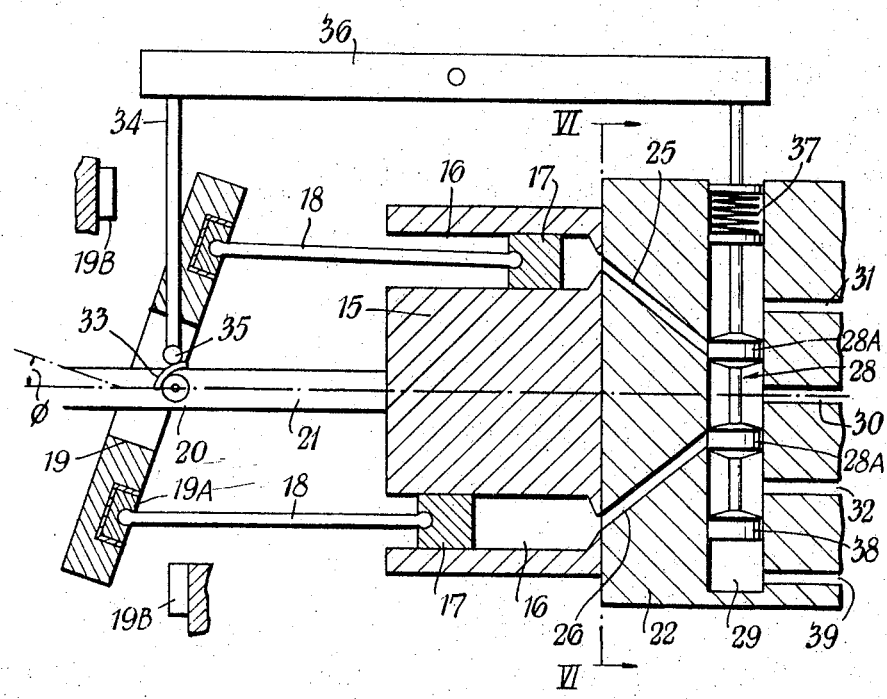
Figure 6:
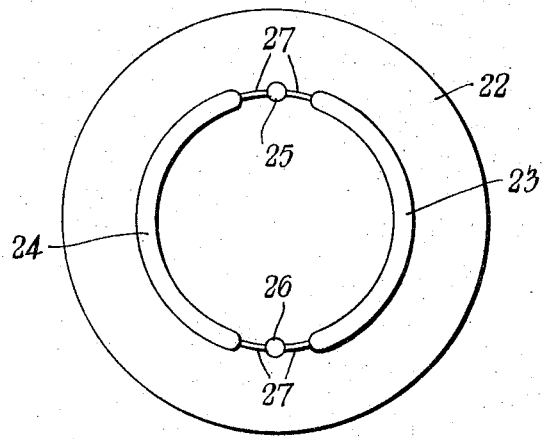

For a better understanding of the invention and to show how the same may be carried into effect, reference will now be made, by way of example, to the accompanying drawings, in which:

FIGURE 1 is a diagrammatic plan view of a radial pump,

FIGURE 1A is a diagrammatic side view, partly in axial section, of part of the pump of FIGURE 1 and showing a first control arrangement, FIGURE 1B is a diagrammatic side view, partly in axial section, of part of a modified form of the pump of FIGURE 1, showing a second control arrangement, FIGURE 2 is a diagram illustrating possible loci of the crank pin of the pump of FIGURE 1, FIGURE 3 is a diagrammatic plan view of part of another radial pump, FIGURE 3A is a diagrammatic side view, partly in axial section, of part of a modified form of the pump of FIGURE 3 and a control device associated therewith, FIGURE 3B is a diagrammatic plan view of part of another modified form of the pump of FIGURE 3, FIGURE 3C is a diagrammatic plan view of part of yet another modified form of the pump of FIGURE 3, FIGURE 4 is a diagrammatic plan view of part of a further radial pump, FIGURE 5 is a diagrammatic axial section of a swash plate pump, FIGURE 6 is a section on the line VI—VI of FIGURE 5, and FIGURE 7 is a diagrammatic plan view of the interior of a vane pump.

In FIGURE 1 the radial pump has three cylinders 1A, 1B, 1C spaced symmetrically about the axis 2 of a driving member 3 mounted for rotation about the axis 2. The member 3 is a substantially cylindrical body having a diametral guide 4 in one end face thereof in which a crank pin 5 is slidably mounted for movement towards and away from the axis 2. Connecting rods 6A, 6B, 6C of equal length connect the pin 5 to pistons 7A, 7B, 7C which are entered with a close sliding fit in the cylinders 1A, 1B, 1C. Inlet and outlet conduits 8A, 8B, 8C and 9A, 9B, 9C for the fluid to be pumped are connected to the cylinders 1A, 1B and 1C and valves 10A, 10B, 10C and 11A, 11B, 11C interposed in those conduits are arranged to be controlled by the rotation of the member 3 by cams 40 and 41 on the member 3 and push rods 42A, 42B, 42C and 43A, 43B and 43C co-operating with those cams. The cams 40, 41 are axially offset as in FIGURE 1A so that the rods 42A, 42B, 42C co-operate only with the cam 40 and the rods 43A, 43B, 43C co-operate only with the cam 41. The cams 40, 41 each extend over a 120° arc and are symmetrically disposed, in the circumferential sense, with respect to the guide 4 whose longitudinal axis bisects the 60° gaps between the ends of the cams. The ends of the rods co-operating with the cams are provided with cam followers which are constrained to have their axes lying each in a plane passing through tthe axis 2 and the axis of the associated cylinder 1A, 1B or 1C as the case may be. The timing of the valves is described below. The inlet conduits 8A, 8B, 8C lead from a common inlet duct 8 to the pump and the outlet conduits 9A, 9B, 9C lead to a common pump outlet duct 9.

The sequence of operation of the valves 10A, 10B, 10C and 11A, 11B, 11C and the corresponding action of the pump is as follows, assuming that the member 3 is rotating in the direction of the arrow and starting from the moment when the longitudinal axis of the guide 4 is aligned with the axis of the cylinder 1A and the piston 7A is at its top dead centre position ($\theta=0°$). $\theta$ will hereinafter refer to the angle through which the guide 4 has rotated from this starting position. At this moment both the valves 10A and 11A are closed, the valve 10B is closed and the valve 11B is open, and the valve 10C is open, and the valve 11C is closed. Thus it will be seen that, with the pin 5 offsets from the axis 2, fluid is being drawn into the cylinder 1C and pumped out of the cylinder 1B, whilst the cylinder 1A is in a cut-off condition. Assuming that there is no further inlet to or outlet from the cylinder 1A, that the fluid remaining in that cylinder is incompressible and that no cavitation takes place, the position of the piston 7A is fixed and will remain fixed until either of the valves 10A, 11A is opened. The locus of the crank pin 5 is therefore determined by the rod 6A whilst the cylinder 1A is cutoff with the piston 7A at its top dead centre position.

The first valve event occurs at $\theta=30°$ when the valve 10A opens upon the follower of the rod 42A encountering the cam 40 and the valve 10C closes as the follower on the rod 42C leaves the cam 40, the other valves remaining as before. The cylinder 1A is thus opened to the inlet conduit 8A and the cylinder 1C is cut-off, whilst the cylinder 1B continues to pump. Fluid is drawn into the cylinder 1A and pumped out of the cylinder 1B, and the volume of fluid in the cylinder 1C effectively determines the locus of the crank pin 5, the piston 7C being fixed at its bottom dead centre position in the cut-off cylinder 1C.

The pump continues to operate in this manner until the next valve event which occurs at $\theta=90°$. At this event the valve 11B closes as the follower of the rod 43B leaves the cam 41 and the valve 11C opens under the follower of the rod 43C encountering the cam 41, the other valve remaining unchanged. The cylinder 1C is therefore able to deliver fluid to the outlet conduit 9C and the cylinder 1B is cutoff. Fluid is drawn into the cylinder 1A and pumped out of the cylinder 1C, the volume of fluid in the cylinder 1B effectively determining the locus of the crank pin 5, the piston 7B being fixed at its top dead centre position in the cut-off cylinder 1B.

The third valve event after $\theta=0°$ occurs at $\theta=150°$ when the valves 10A and 10B change their states and the cylinder 1A again becomes cutoff but with the piston 7T in its bottom dead centre position. The pump then draws fluid into the cylinder 1B and expels fluid from the cylinder 1C, whilst the volume of fluid in the cylinder 1A effectively determines the locus of the crank pin 5. Further valve events occur at $\theta=210°$, $\theta=270°$ and $\theta=330°$ for the second half cycle of the pump and the operation of the valves for this second half cycle is similar to that just described for the first half cycle. The valve event at $\theta=330°$ restores the pump to the operating condition at which the above-described cycle was started.

For each cycle of the pump each cylinder is connected to its associated outlet conduit for a rotation of 120° of the member 3 and to the associated inlet conduit for a similar period, and between each of those two periods each cylinder exerts a control over the crank pin 5 during a rotation of 60° of the member 3. It can be shown that, ignoring inertia effects, the pressure in each cylinder when cut-off varies monotonically from the pump inlet pressure to the pump outlet pressure or vice versa, and therefore pressure shock at each valve event is effectively suppressed.

In the theoretically perfect conditions assumed above with constant pressures at both pump inlet and pump outlet the crank pin will follow (assuming the connecting rods 6A, 6B and 6C are considerably larger than the eccentricity of the pin 5) a substantially hexagonal path GHJKLM as shown in FIGURE 2, where O represents the axis 2 and OA, OB and OC the axes of the cylinders 1A, 1B, 1C respectively. Provided the conditions affecting the pump do not change, the mean eccentricity of the crank pin 5 from the axis 2 is constant and the volume of fluid pumped per cycle remains constant. It will be understood that although in the above described pump the cylinders are stationary and the member 3 is driven, the same effect can be achieved by maintaining the member 3 stationary and mounting the cylinders on a driven member rotating about the axis 2.

There will now be described several control arrangements applicable to the above-described pump for varying the mean eccentricity, the pump then being of the variable displacement type.

In the first of these control arrangements one of the cylinders, 1A say, is connected to an external source 44 of fluid under pressure for the period $-30°<\theta<30°$. This is achieved by providing axially offset cams 45, 46 on a part of the member 3 having a reduced diameter compared with the part carrying the cams 40, 41. The cams 45, 46 each extend over a 60° arc and are bisected by the longitudinal axis of the guide 4. Conduits 47A, 48A lead into a common pipe which connects them to the junction between the conduits 8A, 9A. Valves 49A, 50A are disposed in the conduits 47A, 48A and are arranged to be actuated by push rods 51A, 52A which respectively co-operate with the cams 45, 46. The rods 51A, 52A have cam followers which are constrained to lie in the common plane of the axis of the cylinder 1A and the axis of the member 3. The conduits 47A are normally blocked by the pistons of a spool valve 53 which is operable upon control displacement of the spool 53A of the valve 53 to connect one of the conduits 47A, 48A to the high pressure fluid source 44 and the other to exhaust 54 or vice versa. The cylinder 1A is normally cut-off for the period $-30°<\theta<30°$ with the piston 7A held immovable by the fluid, although the valve 49A is opened by the cam 45 during this period. However, if the spool of the valve 53 is displaced in one direction so that the conduit 47A is open to the high pressure fluid source 44, the introduction of fluid into the cylinder from the external source 44 of fluid which is at a pressure higher than that in the cylinder 1A urges the piston 7A towards the axis 2 thereby forcing the crank pin 5 to follow the path GH' (FIGURE 2). After the valve event at $\theta=30°$, no further fluid is added to the cylinder 1A from the external source 44 because the valve 49A closes and if no such control arrangements are associated with the cylinders 1B and 1C, the crank pin is constrained to move in another substantially hexagonal path H'J'K' . . . with reduced mean eccentricity. A further reduction in eccentricity is caused by fluid escaping from the cylinder 1A during the period $150°<\theta<210°$ when the valve 50A is opened by the cam 46. An increase in mean eccentricity may be effected by displacing the spool of the valve 53 in the opposite direction so that fluid escapes from the cylinder 1A during the period $-30°<\theta<30°$ and is forced into the cylinder 1A from the external high pressure source 44 of fluid during the period $150°<\theta<210°$. Conveniently, since the pressure in a cut-off cylinder lies between the pump inlet and pump outlet pressures, the common pump outlet 9 can constitute the high pressure source 44 and fluid in a cut-off cylinder can be bled into the common pump inlet 8.

In practice control arrangements are provided in association with each of the cylinders 1A, 1B, 1C so that each of the cylinders carries out the control action in the appropriate part of the cycle. The control arrangements associated with the cylinders 1B and 1C have been shown diagrammatically in order not to complicate the drawings.

It has again been assumed that the conditions affecting the pump are such that the pin 5 follows a hexagonal path if no controlling action is taken. In practice, however, the pin 5 will stray from such a path, and therefore a monitoring device, sensitive to the eccentricity and/or volumetric displacement per cycle of the pump, is arranged to co-operate with the control valves for applying appropriate correcting action to the cut-off cylinder to maintain the eccentricity at its desired value. Such devices are described later.

In a second control arrangement, instead of the mechanism for forcing fluid into and bleeding fluid from a cut-off cylinder, there is provided mechanism for varying the valve timing relative to the angular position of the guide 4. This may be achieved by dividing the member 3 into two parts, a circular plate 3A having the guide 4 and a substantially cylindrical block 3B carrying the cams 40, 41 as shown in FIGURE 1B. The plate 3A is fixed to a drive shaft 55 whereas the block 3B is rotatable but not axially displaceable with respect to the shaft 55. A sleeve 56 carried on the shaft 55 and having its left-hand end (FIGURE 1B) entered in the annular space between the shaft 55 and a skirt part 3D of the block 3B is free to be moved axially with respect to the shaft 55 and member 3 through the agency of a ring 57 having an inwardly facing channel in which a flange 56A of the sleeve 56 is rotatably engaged. The shaft 55 has a longitudinal groove 55A in its surface and the block 3B has a part-helical slot 3C in its skirt part 3D, there being porjections 56B, 56C on the inner and outer surface of the sleeve 56 which respectively engage in the groove 55A and the slot 3C. By effecting control movement of the ring 57 axially with respect to the shaft 55, the projections 56B, 56C cause the block 3B to rotate with respect to the plate 3A, i.e. the cams are shifted with respect to the guide 4 through an angle proportional to the axial shift of the ring 57. The effect of the second control arrangement is also shown in FIGURE 2. In this case, if it is desired to increase the eccentricity, the valve event normally occurring at $\theta=30°$ is delayed until $\theta=30°+\alpha$. The crank pin 5, assuming it to be at G when $\theta=-30°$, follows the path GH and beyond to the point H", corresponding to $\theta=30°+\alpha$, at which point the cylinder 1A ceases to be cut-off. The crank pin 5 then moves along H" J", parallel to HJ, while the cylinder 1C is cut-off. If the next and following valve events are delayed from their normal timings, each by an amount $\alpha$, the crank pin 5 is constrained to move along the path GH″ J″ K″ . . . , increasing its eccentricity at each valve event. Similarly, the valve events may be made to occur earlier than normal thereby successively to reduce the eccentricity at each event. Again a monitoring device sensitive to the eccentricity or volumetric displacement may be provided to cause appropriate correcting changes in the valve timings.

A monitoring device sensitive to the eccentricity of the crank pin 5 is shown in FIGURE 1A. A cone 58 coaxial with the member 3 is arranged with its apex adjacent the guide 4 and is mounted for axial movement. The pin 5 has a projection 5A with a conical rolling element which co-operates with the cone 58 so that radial movement of the pin 5 is transformed into axial movement of the cone 58 which is maintained against the projection 5A by a light spring 58A. The cone 58 is connected to the spool 53A of the valve 53 through the intermediary of a piston and cylinder assembly 59 by which it is possible to vary the distance MN between them so as to produce various desired control actions which are described below. An internally screwthreaded collar 58B forming a coaxial extension of the base of the cone 58 engages with a screwthreaded piston rod 59A connected to the piston 59B of the assembly 59. The piston 59B divides the cylinder 59C of the assembly 59 into two chambers, in the left-hand one of which (FIGURE 1A) a control spring 59D is disposed to act between the piston and the end of the cylinder and into the right-hand one of which leads a flexible pipe 59E for the supply of fluid under pressure to oppose the spring 59D. The spool 53A is connected to the cylinder 59C so that axial movement of the latter operates the valve 53. The rod 59A is locked by a nut 58C to the extension 58B of the cone 58 and can be locked to the cylinder 59C by a set screw 59F. For a particular value of the distance MN determined by the assembly 59 the pump will automatically adjust itself to have an eccentricity corresponding to the distance MN, a smaller value of MN corresponding to a smaller value of the eccentricity. This comes about as follows. If the pin 5 strays from its desired path, the cone 58 is axially displaced with corresponding displacement of the spool 53A whereby the valve 53 causes appropriate correcting forces to be applied to the pin 5 by operation of the valves 49A and 50A. It can be seen that the spool 53A can only reset to the neutral central position shown in FIGURE 1A if there is a one-to-one correspondence between the eccentricity of the pin 5 and the distance MN.

The assembly 59 may be used in various ways. Firstly, if the piston 59B is clamped in its cylinder 59C by the set screw 59F at some particular position, then the distance MN is thereafter determined solely by the setting of the screwthreaded piston rod 59A within the extension 58B, which setting can thereby be used as a manual control of the pump eccentricity irrespective of the pressure at which the pump is working.

Secondly, if the screwed piston rod 59A is set and locked by the nut 58C at a datum position within the extension 58B and the piston is unclamped from its cylinder 59C, then, by admitting fluid at a controlled pressure into the cylinder 59 via the pipe 59E, the control spring 59D will be compressed so that the distance MN will be decreased by an amount corresponding to the increase in control pressure.

By the resetting action described above, the pump eccentricity will thereby be determined by the control pressure, a higher control pressure requiring a smaller eccentricity in order that the spool 53A may be reset in its central position.

Thirdly, if it is desired to control the outlet pressure of the pump at a particular value, this may be done by connecting the cylinder 59C to the pump outlet via the flexible pipe 59E and adjusting the screwthreaded piston rod 59A to an appropriate position relative to the cone 58. For a particular setting of the piston rod 59A in the extension 58B the spool 53A can only be in its central position when the compression of the spring 59C is sufficient to compensate for the change in MN caused by the setting of the piston rod. The resetting action is as follows. If the pump is working at a particular pressure and the load which it is supplying changes in a way that requires a smaller flow then the outlet pressure will tend to rise if the pump eccentricity is not reduced. The increase in pressure caused thereby will compress the spring 59D thereby diminishing the distance MN. As described above, this change in MN will move the spool 53A from its central position in such a direction as to cause a decrease in the eccentricity of the pump. This action will continue until the output of the pump is reduced to match that required by the load at the desired operating pressure.

The monitoring device described with reference to FIGURE 1A may be employed in conjunction with the control arrangement of FIGURE 1B. In this case the cylinder 59C of the assembly 59 is mechanically connected to the ring 57 instead of to the spool 53A such that the ring 57 is axially displaced to the same extent as the cylinder of the assembly 59.

Referring to FIGURE 3, a third control arrangement will now be described. In this case the member 3 of the pump has a guide 4′ in the form of a channeled element mounted on the member 3 for rotation therewith and for movement at right-angles to the axis of the channel, this movement being controlled by a piston and cylinder assembly 12 having fluid in the cylinder held at a constant pressure. It will be seen from FIGURE 3 that when during the period −30°<θ<30° the guide 4′ moves from its diametral position OS to a position O′S′ offset from OS by an amount e, the valve event at θ=30° finds the crank pin 5 at a position H‴ on GH produced. The mean eccentricity is therefore increased at this valve event, and if the guide 4′ is maintained in this offset position the mean eccentricity is increased at each succeeding valve event, the crank pin 5 following the path GH‴J‴K‴ . . . Similarly whenever the guide moves to an offset position on the opposite side of OS to that shown in FIGURE 3 a reduction of the eccentricity will result.

It can be shown that for −30°<θ<30°, assuming that the guide 4′ is in its diametral position and again ignoring such factors as inertia, the compressibility of fluid and possible leakage, the following equation holds for the forces acting along the axis of the piston and cylinder assembly 12:

$$F \cos \theta = (F_0 - F_1) \sin 120° \ldots \quad (1)$$

where F is the force exerted by the piston of the assembly 12 on the guide 4′ and where $F_0$ and $F_1$ are the forces respectively proportional to the pump outlet and inlet pressures. If the pressure difference between the inlet and outlet, which is directly proportional to $(F_0-F_1)$, rises above that which can be sustained by the assembly 12, Equation 1 will no longer hold and the guide 4′ will move in a direction to reduce the eccentricity and correspondingly the pressure difference. Hence the pump automatically adjusts its eccentricity to accommodate the requirements of the load.

If, instead of the assembly 12, the guide 4′ has piston and cylinder assemblies 60 and 61 one on each side thereof as shown in FIGURE 3A, then the pressure difference between the ducts 8 and 9 of FIGURE 1 may be made positive or negative as desired. Consider the case in which the pump is connected, say, to a hydraulic motor driving a load which has substantial inertia. If the pressure difference between the piston and cylinder assemblies 60 and 61 and therefore, for equilibrium, between the ducts 8 and 9 is reduced to zero the hydraulic motor will continue to run substantially at the same speed as before under the influence of the inertia of its load. The eccentricity of the pump will therefore need to continue at the value it had before the pressure was reduced. If now a pressure difference is applied to the pistons of the assemblies 60 and 61 in the opposite direction to that originally applied, the pressure difference in the ducts 8 and 9 will now be in the direction to apply a braking action to the load which will therefore be brought to rest in a regenerative manner, the pump now acting as a motor. As the load comes to rest so the eccentricity of the pump will reduce to zero and if the pressure difference between the assemblies 60 and 61 is maintained in the direction required for braking action the load will be driven in the reverse direction with the pump eccentricity increasing in the opposite direction from the original. The necessary connections to the pistons 60 and 61 may be made as shown in FIGURE 3A. A slip ring 62 surrounding the driving shaft 63 of the member 3 co-operates with the underside of the member 3, to which underside ducts 64, 65 lead from the assemblies 60, 61 respectively. Inner and outer concentric grooves 66, 67 in the upper face of the ring 62 register with the ducts 64, 65 respectively and are connected by passages in the ring 62 and pipes 68, 69 to a spool valve 70. The valve member 71 of the valve 70 has two pistons 71A, 71B which normally block the pipes 68, 69. A high pressure fluid supply line 72 leads through a pressure regulator 77 having a manually operable control member 77A, to the chamber between the pistons 71A, 71B and the two end chambers 73, 74 formed by the pistons are open to exhaust or a fluid sink through ports 75, 76. The member 71 is normally displaced either to the left or the right (FIGURE 3A) from the position shown so that either the assembly 61 or the assembly 60 has the control pressure on the downstream side of the regulator 77 continuously applied thereto. When an alteration in working pressure is desired, the regulator 77 is adjusted to change the pressure in the assembly 60 or 61 whereby the guide 4' is caused to move laterally and thus bring about such a change in eccentricity as is required to match the characteristic of the load.

Where a more complicated relation between pump pressure and pump eccentricity is required with the control means shown in FIGURES 3 and 3A, this may be achieved by using the eccentricity detecting cone 58 of FIGURE 1A to modify appropriately the outlet pressure of the regulator 77 of FIGURE 3A, for example by directly connecting the cylinder 59C of the assembly 59 to the manual control member 77A of the regulator 77. For the braking action described above the regulator is adjusted so that the pressure difference between the assemblies 60 and 61 is reduced to zero, and then the valve 70 is operated so that a pressure difference acting in the opposite direction can be applied to the pistons of the assemblies 60 and 61 upon further adjustment of the regulator 77.

Control devices giving a constant set pressure or a pressure proportional to the speed of rotation of the member 3 can be incorporated in the pump in place of the assembly 12. Two such devices are shown in FIGURES 3B and 3C. The constant set pressure is provided in the arrangement of FIGURE 3B by two compression springs 80, 81 acting between the ends of the guide 4' and the member 3. The compression of the springs 80, 81 can be adjusted by turning screw-threaded plugs 80A, 81A which bear on the springs. The speed-dependent pressure is achieved in the arrangement of FIGURE 3C by weights 82, 83 attached to the free ends of the longer arms of two bell-crank levers 84, 85 pivotally mounted on the member 3.

The shorter arms of the levers 84, 85 have slots in which a pin 86 on a lateral extension 87 of the guide 4' is engaged. As the speed of rotation of the member 3 increases or decreases, the weights 82, 83 move radially outwardly or inwardly, moving the guide 4' through the intermediary of the levers 84, 85, the pin 86 and the extension 87 to increase or decrease the eccentricity of the crank pin until the load balances the force of the weights 82, 83 and the guide is restored to the diametral position.

A further modification of the embodiment of FIGURE 3 is shown in FIGURE 4 where a T-shaped plate 13 mounted on the member 3 for rotation therewith and relative thereto about the axis 2 carries a piston and cylinder assembly 12' controlling lateral movement of a channeled guide 4''. The arms of the T-shaped plate 13 have slide-ways 13A, 13B in which are entered slides 13C, 13D on the guide 4'', whereby the latter is constrained to move in a direction perpendicular to the axis of the channel, its travel being limited by the slides 13C, 13D encountering the ends of the slideways 13A, 13B, which ends thereby constitute stops. Two diametrically opposite piston and cylinder assemblies 14 act between the member 3 and the ends of the arms of the T-shaped plate 13. The piston and cylinder assembly 12' is supplied with fluid at a pressure $P_D$ and the assemblies 14 with fluid at a pressure $P_T$. The action of this pump is as follows, assuming initially that the guide 4'' is in a diametral position corresponding to the position of the guide 4 of FIGURE 2, that torque provided by the fluid at pressure $P_T$ in the assemblies 14 holds the plate 13 in the position for phase operation of the inlet and outlet valves 10A, 10B, 10C and 11A, 11B, 11C as described with reference to FIGURE 1, and that the pin 5 has zero eccentricity so that there is zero flow. When flow commences into the load the outlet pressure momentarily drops below that required to balance the force arising from the fluid at pressure $P_D$ in the assembly 12' and the guide 4'' moves to a position O'S' causing successive increases of eccentricity at each valve event. As long as the torque on the guide 4'' is sufficiently low for the control torque exerted by the piston and cylinder assemblies 14 to retain the plate 13 in its original position relative to the driving member 3 where the assemblies 14 are fully extended and further extension is prevented by stops 14A, the pump acts as the pump shown in FIGURE 3 and delivers fluid at constant pressure. If, at a critical value of torque which equals that provided by the assemblies 14, the load flow increases allowing the outlet pressure to drop, the guide 4'' moves away from its diametral position increasing the eccentricity. This increase returns the outlet pressure towards normal but also causes the torque to exceed that provided by the assemblies 14, and thus the plate 13 rotates with the guide 4'' relative to the driving member 3''. This alters the timing of the valve events relative to the rotation of the guide 4'' and tends to reduce the eccentricity in a manner explained above with reference to FIGURE 2. Further increase in load flow again reduces the outlet pressure and correspondingly the torque so that the guide 4'' returns towards its original position relative to the member 3 thereby increasing the eccentricity. The increased flow from the pump tends to increase the outlet pressure but this increase proceeds only until the condition is reached in which the product of the outlet pressure and the eccentricity balances the control torque provided by the assemblies 14. When the outlet pressure is less than that required to balance the lateral thrust provided by the assembly 12', the guide 4'' moves to a position away from the axis of the member 3'' and the plate 13 is turned relative to the member 3 by the piston and cylinder assemblies 14 so that the crank pin remains in phase with the valve action when the system is in equilibrium. It will be understood from the above that the pump adjusts itself to maintain the outlet pressure constant at a pressure corresponding to $P_D$ for flows which are less than that value for which the product of flow and set pump outlet pressure is equal to the critical value determined by the pressure $P_T$ and, for flows greater than this, allows the pressure to fall below the set value to maintain the product of flow and pump outlet pressure constant at the critical value of torque.

The value of the eccentricity at which the changeover from constant pressure working to constant torque working is determined by the ratio $P_T:P_D$ and this may be altered by control devices (not shown) for the assemblies 12' and 14.

In the arrangement of FIGURE 4 the control forces on the guide 4" arise from fluid pressures in the assemblies 12' and 14 and this is convenient if it is desired to alter these pressures. It will be understood that, instead of the single piston and cylinder assembly 12' a double arrangement such as that shown in FIGURE 3A can be employed while the control of the fluid in the assemblies 14 is also carried out through the intermediary of a slip ring. If such alteration is not necessary the constant forces may be supplied by springs as in FIGURE 3B or by using the centrifugal force provided by the rotation of an element of the pump as in FIGURE 3C.

The radial pumps described above are of the three-cylinder type and the valve timings are such that at all times during operation of these pumps one and only one cylinder at a time is cut-off from both inlet and outlet. It will be understood that radial pumps having more than three cylinders can be controlled by a system corresponding to any one of the systems described in connection with FIGURES 1 to 4, the locus of the crank pin of an N-cylinder pump being an N-sided polygon when N is even and a 2N-sided polygon when N is odd. The valve timings for such pumps would ensure that only one cylinder is cut off at a time when N is odd and two diametrically opposite ones when N is even. It is possible that the valves of the radial pumps may allow the crank pin to be momentarily free of restraint at a valve event. However, the shortness of the period of freedom will be substantially without effect upon the operation of the pump because of the inertia of the crank pin.

The swash plate pump of FIGURE 5 has a cylinder barrel 15 in which are formed parallel cylinders 16 regularly spaced about the axis of the barrel 15. Pistons 17 are entered with a close sliding fit in the cylinders 16 and are connected by ball-ended rods 18 to a socketed thrust ring 19A of a swash plate 19 mounted for pivoting movement about an axis 20 perpendicular to the plane of the drawing and passing through the axis of the cylinder barrel 15. The thrust ring 19A is rotatably carried by thrust and journal bearings in an annular channel in the swash plate 19. The cylinder barrel 15 is rotated by a drive shaft 21 which passes freely through a central hole in the swash plate 19. A valve plate 22 bears in sealing relationship against that end face of the barrel 15 which is remote from the swash plate 19, the valve plate 22 having a kidney-shaped inlet port 23 (FIGURE 6), a kidney-shaped outlet port 24, and control ports 25, 26 which are disposed between the ends of the ports 23 and 24. Shallow grooves 27 in the sealing face of the valve plate 22 can be provided to interconnect the ports 23 to 26 for avoiding shock loading if such would otherwise occur when the cylinders are blanked off in operation of the pump. The valve plate 22 is so arranged that the ports 25, 26 respectively lie opposite the top dead centre and bottom dead centre positions of the pistons 17. A spool valve 28 is slidably entered in a bore 29 in the plate 22, the valve 28 having pistons 28A normally shutting off the ports 25, 26. A duct 30 from a high pressure liquid source leads into the bore 29 between the ports 25 and 26 and two ducts 31, 32 lead from the bore 29 to exhaust, the duct 30 being between the ducts 31 and 32 and separated therefrom by the two pistons 28A on the valve 28. A cam 33 is fixedly mounted on the trunnion shaft of the swash plate 19 and a push rod 34 having a cam follower 35 at one end thereof co-operating with the cam 33 is arranged with its other end abutting one arm of a rocking beam 36. The other arm of the beam 36 presses against the valve 28 via a spring 37. The spool valve 28 has a third piston 38 at the end remote from the spring 37, and a duct 39 leading from the pump outlet communicates with the closed end of the bore 29, the piston 38 separating this closed end from the duct 32.

It is to be noted that there is no linkage leading from the outside of the pump to the swash plate 19 for controlling the tilt thereof.

In operation of the pump the cylinder barrel 15 is rotated about its axis by the shaft 21, which rotation causes reciprocating movement of the pistons 17 in the cylinders 16, the swash plate 19 being at an angle of tilt $\phi$ greater than 0°, this angle of tilt $\phi$ being the angle between the normal to the swash plate 19 and the axis of the cylinder barrel 15. Stops 19B are provided for preventing the plate 19 from tilting anticlockwise (FIGURE 5) beyond the position where $\phi=0°$. The reciprocation of the pistons 17 in the cylinders 16 with simultaneous rotation of the barrel 15 causes liquid to be drawn from the pump inlet port 23 and delivered through the port 24 to the pump outlet.

For operating equilibrium of the pump the valve 28 is in the position shown in FIGURE 5. If the demand on the pump is reduced so that the outlet pressure of the pump increases above the required value the corresponding increase in pressure in the closed end of the bore 29 causes the valve 28 to be pushed upwards against the spring 37. The duct 30 is placed in communication with the port 25 and the duct 32 in communication with the port 26, so that high pressure liquid is admitted to the cylinder 16 whose piston is at top dead centre and liquid flows from the cylinder 16 whose piston 17 is at bottom dead centre. The swash plate 19 is therefore caused to tilt to reduce the angle $\phi$, the cam 33 pushing the rods 34 upwardly to pivot the beam 36 which pushes downwardly on the spring 37 whereby the valve 28 is caused to be reset. Following the reduction in the angle of tilt the pump outlet pressure is reduced. Similarly, if the demand on the pump increases causing the outlet pressure to decrease the resulting displacement of the valve 28 causes the swash plate 19 to tilt to increase the angle and the pump outlet pressure increases.

The swash plate pump illustrated has a cylinder barrel 15 with an even number of cylinders 16 which enables both ports 25, 26 simultaneously to exert a control on the swash plate 19. However, a swash plate pump having an odd number of cylinders can also have a similar valve plate with two diametrically opposed control ports. The swash plate is then controlled by one port at a time, the ports functioning alternately. It will be noted that there is here an equivalence between the swash plate pump and the radial pump, the control being through the agency of a single piston and cylinder for a pump having an odd number of cylinders and through the agency of two diametrically opposite pistons and cylinders for a pump having an even number of cylinders. The lands between the control ports 25 and 26 and the inlet and outlet ports 23, 24 are such that there is always a control force on the swash plate from one or two cylinders according to whether there is an odd or even number of cylinders although, as is the case with the radial pump, momentary freedom from restraints can be tolerated by virtue of the inertia of the swash plate. Instead of providing the control ports 25 and 26, the valve 28 and the resetting mechanism associated with the cam 33, the swash plate 19 may be mounted so as to be tiltable about an axis perpendicular to the axis 20 and to the axis of the pump. If the swash plate is tilted about this further tilt axis the top and/or bottom dead centre pistons will not be mid-way between the ends of the ports 23, 24 and the valve timing is affected in a manner analogous to the action of the radial pump of FIGURE 3 to alter the tilt of the swash plate about said first-mentioned axis. A similar effect may be achieved by making the valve plate 22 rotatable and providing gear teeth on part of its periphery, the gear teeth meshing with a rack that can be displaced for control purposes.

A control system such as that used with the swash plate pump shown in FIGURE 5 can be used with a vane pump. FIGURE 7 shows a vane pump having a valve plate 90 similar to the valve plate shown in FIGURE 6, the inlet, outlet and control ports again being referenced 23–27. Vanes 91 are carried in slots in a rotor 92 within a cylindrical chamber whose curved surface is formed by a track ring 93 with which the tips of the vanes co-operate. Opposite sides of the cylindrical chamber are closed by plates one of which is the plate 90. The track ring 93 is fixed within a holder 94 to which the valve plate 90 is also attached. The holder 94 is mounted for lateral movement in the direction of the arrows A so that the pump has variable eccentricity. The position of the track ring with respect to the rotor is determined by the fluid in the maximum and minimum volume spaces between the vanes, these spaces being in communication with the control ports 25, 26. The spool valve arrangement of FIGURE 5 can be employed to give automatic correction of eccentricity in response to fluctuations in pressure of the outlet of the pump. Alternatively for control purposes the valve plate 90 may be rotatable mounted on the holder 94, or the valve plate 90 and its holder 94 may be bodily movable in a direction perpendicular to the axis of the rotor 92 and to the direction of the arrows A, the ports 25, 26 being omitted. In both cases control mechanism would be provided for effecting the required movements.

If, in the radial piston pump of FIGURE 1, the member 3 is held stationary and the pistons 1A, 1B, 1C are rotated about the axis 2, the required valve and control actions may be achieved by mounting the cylinders on a plate in which are provided ports, one communicating with each cylinder, and which can co-operate with the ports of a valve plate as shown in FIGURE 6. The valve and control actions will then be similar to those described for the swash plate and vane pumps.

The pumps described above can be employed for pumping gases instead of liquids. Although all the above-described embodiments are pumps, it is to be understood that by changing the inlets to outlets and vice versa an equivalent hydraulic motor can be obtained.

I claim:
1. A multi-chamber machine comprising a crank pin, a plurality of piston and cylinder assemblies, each defining a variable-volume chamber and equally spaced about a central axis and rotatable relative to said pin, means connecting said pin to said assemblies for varying the volume of said chambers upon relative rotation between the pin and said assemblies when the pin is offset from said axis, a fluid inlet having a connection to each chamber, a fluid outlet having a connecton to each chamber, valve means for opening and closing said chambers to the inlet and outlet, means mounting said crank pin to permit variation in eccentricity of said crank pin with respect to said axis by movement of said pin on said mounting means towards and away from said axis and thus alteration of the total change of volume of all the chambers in one cycle of the machine, means for actuating said valve means in accordance with said relative rotation to cut-off the chambers for periods when they are at maximum and minimum volume, to open the chambers to the fluid inlet during a period when their volume is increasing and to open the chambers to the fluid outlet when their volume is decreasing, whereby fluid in said chambers serves to maintain the eccentricity of the crank pin, said crank pin being responsive to the variation of the effect of the fluid in a cut-off chamber to alter said eccentricity by movement of the pin on said mounting means the valve means being arranged to cut-off the assemblies twice during each cycle of the machine, the proportion of cut-off time per cycle of the machine being the same for each assembly, and control means for varying the effect of the fluid in the cut-off chamber including further valve means associated with at least one of said assemblies for enabling an alteration of the fluid content of that assembly to be made when that assembly is cut-off thereby to alter the relative positions of the piston and cylinder of that assembly during the cut-off period thereof and thus to move said pin on said mounting means.

2. A machine according to claim 1, wherein means co-operating with the further valve means are provided to monitor the eccentricity of the crank pin and to restore the crank pin, by acting on the further valve means, to a desired path should the crank pin stray from that desired path.

3. A multi-chamber machine comprising a crank pin, a plurality of piston and cylinder assemblies, each defining a variable-volume chamber, spaced about a central axis and rotatable relative to said pin, means connecting said pin to said assemblies for varying the volume of said chambers upon relative rotation between the pin and said assemblies when the pin is offset from said axis, a fluid inlet having a connection to each chamber, a fluid outlet having a connection to each chamber, valve means for opening and closing said chambers to the inlet and outlet, means mounting said crank pin to permit variation in eccentricity of said crank pin with respect to said axis by movement of said pin on said mounting means towards and away from said axis and thus alteration of the total change of volume of all the chambers in one cycle of the machine, means for actuating said valve means in accordance with said relative rotation to cut-off the chambers for periods when they are at maximum and minimum volume, to open the chambers to the fluid inlet during a period when their volume is increasing and to open the chambers to the fluid outlet when their volume is decreasing, whereby fluid in said chambers serves to maintain the eccentricity of the crank pin, said crank pin being responsive to the variation of the effect of the fluid in a cut-off chamber to alter said eccentricity by movement of the pin on said mounting means, and control means for varying the effect of the fluid in a cut-off chamber, said control means including means for altering the timing of the valve means to in turn respectively lengthen and shorten the cut-off periods of the assemblies, thereby to change the eccentricity of said crank pin and thus the total change of volume of all the chambers in one cycle.

4. A machine according to claim 3, wherein means co-operating with the means for altering the timing of the valve means are provided to monitor the eccentricity of the crank pin and to restore the crank pin, by acting on the altering means, to a desired path should the crank pin stray from that desired path.

5. A multi-chamber machine wherein each chamber is variable-volume chamber, said machine comprising means for varying the volume of each chamber cyclically to increase and decrease said volume, means mounting the volume-varying means for guided movement with respect to an axis of the machine, means connecting the chambers and volume-varying means for relative movement with respect to each other for alteration of the total change of volume of all the chambers in one cycle of the machine, said mounting means being provided with a guide for the volume varying means in its movements relative to said axis, a fluid inlet having a connection to each chamber, a fluid outlet having a connection to each chamber, means for respectively cutting off the chambers completely for periods during their cyclic operation, whereby the fluid in the respective chambers during said periods serves to determine the position of the volume-varying means on the guide, said volume-varying means being responsive to the variation of the effect of the fluid in a cut-off chamber to alter the position of the volume-varying means on said guide.

6. A machine according to claim 5, and further comprising a member carrying the mounting means movably relatively to the member in a direction transverse to the longitudinal direction of the guide and towards and away from said axis, and means acting between said member and said mounting means to apply to the latter a force acting in said transverse direction.

7. A machine according to claim 6, wherein the force applying means is a fluid filled piston and cylinder assembly.

8. A machine according to claim 6, wherein the force applying means is spring means.

9. A machine according to claim 6, wherein the force applying means is centrifugally operated means.

10. A machine according to claim 6, wherein biasing means is provided which acts between said mounting means and said members to urge the guide to turn about said axis relative to said member from an initial position relative to said member.

11. A machine according to claim 10, wherein said biasing means are two fluid filled piston and cylinder assemblies acting in opposite directions at opposite ends of the guide.

12. A multi-chamber machine comprising a swash plate, means for supporting the swash plate for tilting about a particular tilt axis, a valve plate having a face formed with kidney-shaped fluid inlet and outlet ports spaced apart at their adjacent ends by lands, a cylinder barrel having one end face co-operating with said face of the valve plate, means for rotating the barrel about its axis relative to the valve plate, the barrel being formed with longitudinally directed cylinders disposed about said axis, and there being further ports between said cylinders and said one end face of the barrel for registering with said inlet and outlet ports upon relative rotation of the barrel and valve plate, said valve plate being provided with control ports one in each of the lands between the adjacent ends of the kidney-shaped ports, for cooperating with those of said further ports which communicate with cut-off cylinders, pistons in said cylinders co-operating with the swash plate to be reciprocated in the cylinders when the barrel rotates relative to the swash plate provided the latter is tilted, fluid flowing into increasing volume cylinder chambers and out of decreasing volume cylinder chambers, the swept volume of the cylinders per cycle of the machine corresponding to the extent of the tilt of the swash plate from a zero tilt position, the valve plate being angularly disposed relative to the swash plate to cut-off the cylinders having the pistons at top and bottom dead centre positions from said inlet and outlet ports whereby fluid in the cut-off cylinders prevents movement of the pistons therein, which in turn maintain the swash plate tilted.

13. A machine according to claim 12 and further comprising means for altering the fluid content of the cut-off cylinders via said control ports thereby to alter the tilt of the swash plate.

14. A machine according to claim 13, wherein the altering means comprises control valve means, a high pressure source of fluid and an exhaust outlet, the control valve means including a valve member having three operative positions, viz. a first position in which the valve member blanks-off both control ports, a second position in which the valve member is displaced in one sense from its first position to place one control port in communication with the high pressure source and the other with exhaust, and a third position in which the valve member is displaced in the opposite sense from its first position to place said other control port in communication with the high pressure source and said one control port with exhaust.

15. A machine according to claim 13, and further comprising means for displacing the valve member in accordance with the pressure in the kidney-shaped port acting as the delivery port of the machine.

16. A machine according to claim 15, wherein means is provided connecting the swash plate to the valve member for resetting the latter to said first position when the swash plate has tilted.

17. A multi-chamber machine comprising a slotted rotor, radially directed vanes carried by the slots of the rotor, a track ring surrounding said rotor and vanes, the outer ends of the latter co-operating with the inner surface of the track ring, means mounting the track ring for permitting movement of the latter in one direction perpendicular to the rotor axis to vary the eccentricity of the ring with respect to the rotor, plates on opposite sides of the rotor forming with the vanes, rotor and track ring a plurality of variable-volume chambers, there being maximum and minimum volume chambers when said eccentricity is other than zero, one of the plates having kidney-shaped fluid inlet and outlet ports spaced apart at their adjacent ends by lands which cut-off the chambers at maximum and minimum volume, said one plate being provided with control ports one in each of the lands between adjacent ends of the kidney-shaped ports for cooperating with the cut-off chambers, fluid flowing when the rotor rotates and the eccentricity is greater than zero into increasing volume chambers through said inlet port and out of decreasing volume chambers through said outlet port, the arrangement of the cut-off chambers with respect to the track ring being such that the fluid in the cut-off chambers maintains the track ring eccentric with respect to the rotor.

18. A machine according to claim 17, wherein control valve means is provided for supplying high pressure fluid to one of the control ports and for exhausting the other thereby to vary the eccentricity of the track ring.

19. A machine according to claim 18, wherein the control valve means has a connection to a high pressure source of fluid and an exhaust outlet and includes a valve member having three operative positions, viz, a first position in which the valve member blanks-off both control ports, a second position in which the valve member is displaced in one sense from its first position to place one control port in communication with the high pressure source and the other with exhaust, and a third position in which the valve member is displaced in the opposite sense from its first position to place said other control port in communication with the high pressure source and said one control port with exhaust.

References Cited by the Examiner

UNITED STATES PATENTS

| 1,521,884 | 1/1925 | Higgins | 103—162 |
| 2,016,802 | 10/1935 | Fick | 103—38 |
| 2,129,828 | 9/1938 | Dunn | 103—38 |
| 2,266,003 | 12/1941 | Clark | 103—174 |
| 2,429,011 | 10/1947 | Wylie | 103—161 |
| 2,592,247 | 4/1952 | Coe | 103—120 |
| 2,633,805 | 4/1953 | Haugdahl | 103—120 |

FOREIGN PATENTS 390,876  4/1933  Great Britain.

LAURENCE V. EFNER, *Primary Examiner.*